(12) United States Patent
Hulscher et al.

(10) Patent No.: US 8,191,928 B2
(45) Date of Patent: *Jun. 5, 2012

(54) STABILIZING ASSEMBLY FOR A FORWARDER HEADBOARD AND METHOD

(75) Inventors: Jay T. Hulscher, Waseca, MN (US); Nick B. Johnson, Owatonna, MN (US)

(73) Assignee: Caterpillar Forest Products Inc., Peoria, IL (US)

( * ) Notice: Subject to any disclaimer, the term of this patent is extended or adjusted under 35 U.S.C. 154(b) by 766 days.

This patent is subject to a terminal disclaimer.

(21) Appl. No.: 12/260,761

(22) Filed: Oct. 29, 2008

(65) Prior Publication Data

US 2010/0104406 A1    Apr. 29, 2010

(51) Int. Cl.
B60P 1/48 (2006.01)
(52) U.S. Cl. ........................................ 280/748; 414/455
(58) Field of Classification Search .................. 414/455; 144/38; 280/748

See application file for complete search history.

(56) References Cited

U.S. PATENT DOCUMENTS

| | | | |
|---|---|---|---|
| 2,514,785 A | 7/1950 | Nechville et al. | |
| 3,934,679 A | 1/1976 | Lieptz | |
| 4,405,280 A | 9/1983 | Cochran et al. | |
| 5,165,707 A | 11/1992 | Morimanno, Sr. et al. | |
| 5,308,216 A | 5/1994 | Herolf | |
| 5,366,337 A | 11/1994 | Eriksson | |
| 5,439,152 A | 8/1995 | Campbell | |
| 5,628,354 A | 5/1997 | Kingston | |
| 6,368,047 B1 | 4/2002 | White | |
| D460,086 S | 7/2002 | Bjorklund et al. | |
| 6,558,105 B2 | 5/2003 | Bjorklund et al. | |
| 7,070,222 B2 | 7/2006 | Bruford et al. | |
| 7,828,328 B2* | 11/2010 | Hulscher et al. | 280/748 |
| 7,832,451 B2* | 11/2010 | Miller et al. | 160/113 |
| 2007/0278810 A1 | 12/2007 | Collins | |

FOREIGN PATENT DOCUMENTS

WO    2004/026667 A1    4/2004

* cited by examiner

Primary Examiner — Charles A Fox
(74) Attorney, Agent, or Firm — Leydig, Voit & Mayer

(57) ABSTRACT

A machine includes a frame having a payload portion, an operator cab, and a crane disposed on a base connected to the frame between the payload portion and the operator cab. The machine further includes a headboard assembly connected to the frame and disposed between the base and the payload portion. A stabilizing pin arrangement includes a floating connection arrangement connecting the headboard assembly to the frame. The floating connection arrangement includes at least two resilient elements, each of the two resilient elements being disposed on either side of a member connected to the headboard assembly.

20 Claims, 5 Drawing Sheets

STABILIZING ASSEMBLY FOR A FORWARDER HEADBOARD AND METHOD

TECHNICAL FIELD

This patent disclosure relates generally to a machine that carries loads and, more particularly, to a log forwarder. The claims contained herein are subject to a terminal disclaimer over U.S. Pat. No. 7,828,328.

BACKGROUND

In the forestry industry, it is common for trees to be cut down in the woods and then hauled to a central collection point for further processing. One type of machine used for loading and transporting logs is typically referred to as a log forwarder or, simply, a forwarder. A forwarder typically includes a frame that can be unitary or articulated in one or more locations. An operator cab is mounted onto a portion of the frame, and an engine or other prime mover provides motive and implement power to the forwarder. The forwarder further includes a payload portion, which can accommodate logs of different lengths to be deposited thereon for transport. Such logs can be loaded onto the payload portion by an articulated arm or boom having a grapple disposed at an end thereof. During operation, an operator may control motion of the boom to position the grapple over logs that have previously been cut. The grapple can engage the logs such that the boom may deposit them onto the payload portion.

One example of a forwarder can be seen in U.S. Pat. No. 6,558,105 (the '105 patent), which was granted on May 6, 2008, and is assigned on its face to Caterpillar Inc., of Peoria, Ill. The '105 patent describes a forwarder that includes a structure identified as a "load gate." The load gate is a structure that extends between the payload portion and an operator cab of the forwarder. The load gate is used to protect the operator cab from logs shifting during transport, as well as to align the logs onto the payload portion during loading. As can be seen in the '105 patent, which is incorporated herein by reference, the payload portion of a forwarder includes a series of bunks, which are structures extending horizontally and vertically away from the frame of the forwarder to define a payload bay. The payload bay accommodates the logs that can be loaded onto the forwarder.

The boom of a forwarder is typically operated by hydraulic actuators, and has a broad range of motion. Hence, a connection point or base connecting the boom to the frame of the forwarder can often include a large number of moving parts and hydraulic hoses. The load gate is typically positioned adjacent to the base of the boom to protect the various machine components located at or around the base from damage or interference with the payload. Such positioning of the load gate is necessary to prevent damage to components or connections of the boom, but can also subject the headboard to impacts or other loading during service.

SUMMARY

The disclosure describes, in one aspect, a machine having a frame that includes a payload portion, an operator cab, and a crane disposed on a base connected to the frame between the payload portion and the operator cab. The machine further includes a headboard assembly connected to the frame and disposed between the base and the payload portion. A stabilizing pin arrangement connects the headboard assembly to the frame using a floating connection arrangement. The floating connection arrangement includes at least two resilient elements, each of which is disposed on either side of a member connected to the headboard assembly.

In another aspect, the disclosure describes a stabilizing assembly for a headboard of a log forwarder machine. The log forwarder has a frame that includes an engine portion and a payload portion, a base connected to the payload portion of the frame, and a crane connected to the base. The headboard is connected to the payload portion of the frame and includes a stationary gate that is pivotally connected to the frame and a moveable gate that is slidably connected to the stationary gate. The stabilizing assembly includes a casing connected to the stationary gate and forming a bore that extends therethrough. A washer forming an opening is positioned within the bore and is connected to the casing. An elongate bar extends through the opening and has a flange forming a pin opening connected at one end thereof. A backing ring is connected to the elongate bar and disposed on one side of the washer. An additional backing ring is connected to the elongate bar and disposed on another side of the washer. A linear spring is disposed between the backing ring and the washer, and an additional linear spring is disposed between the additional backing ring and the washer.

In yet another aspect, the disclosure provides a method of operating a log forwarder having a headboard. The log forwarder further includes a frame defining a payload portion, a base connected to the payload portion, and a crane connected to the base. The headboard is connected to the payload portion of the frame and includes a stationary gate that is pivotally connected to the frame and a moveable gate that is slidably connected to the stationary gate. The method includes providing a stabilizer interconnecting the stationary gate of the headboard with the frame. At least some pivotal motion of the headboard relative to the frame is permitted by extending and retracting an elongate bar connected to the frame relative to a casing of the stabilizer. When the headboard is tilting in one direction or another relative to the frame, a first axial spring is compressed and a second axial spring is extended.

DETAILED DESCRIPTION

This disclosure relates to a load gate or headboard of a log forwarder that can improve visibility of the payload by the operator during operation as well as provide improved access to various systems and components of the forwarder during service. The headboard arrangement described in the disclosure can accomplish this by use of a single actuator that operates to both adjust the height of the headboard as well as the tilt of the headboard relative to the frame of the forwarder. It is noted that while the arrangement is illustrated in connection with a forwarder, the arrangement disclosed herein has universal applicability in various other types of machines as well.

The term "machine" may refer to any machine that performs some type of operation associated with an industry such as mining, construction, farming, transportation, or any other industry known in the art. For example, the machine may be an earth-moving machine, such as a wheel loader, excavator, dump truck, backhoe, motor grader, material handler or the like. Moreover, an implement may be connected to the machine. Such implements may be utilized for a variety of tasks, including, for example, loading, compacting, lifting, brushing, and include, for example, buckets, compactors, forked lifting devices, brushes, grapples, cutters, shears, blades, breakers/hammers, augers, and others.

Figure 1:
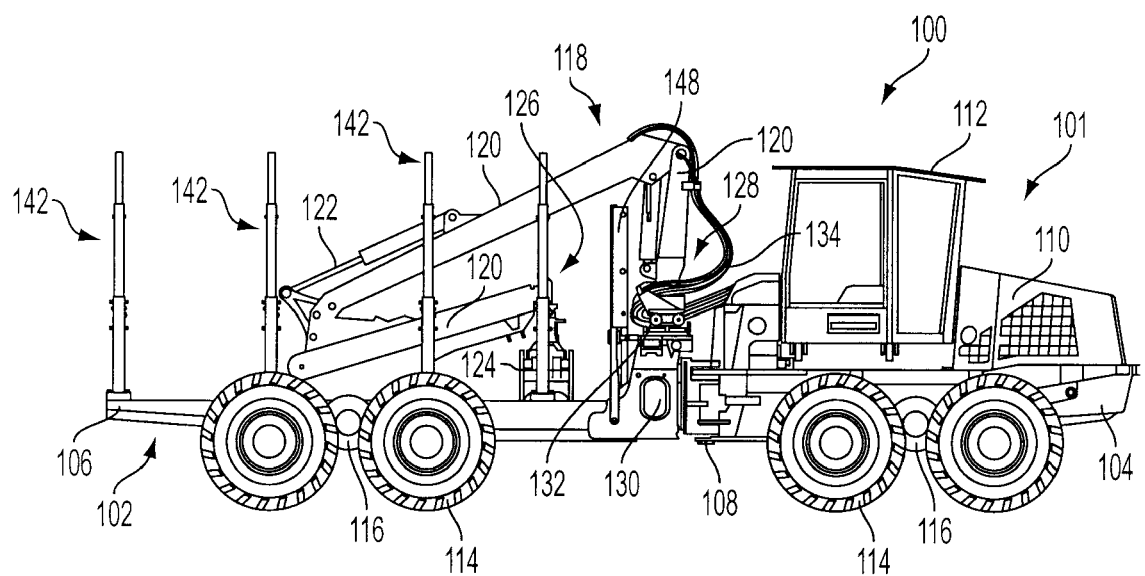
FIG. 1 and FIG. 2 are outline views from different perspectives of a log forwarder in accordance with the disclosure.
Figure 2:
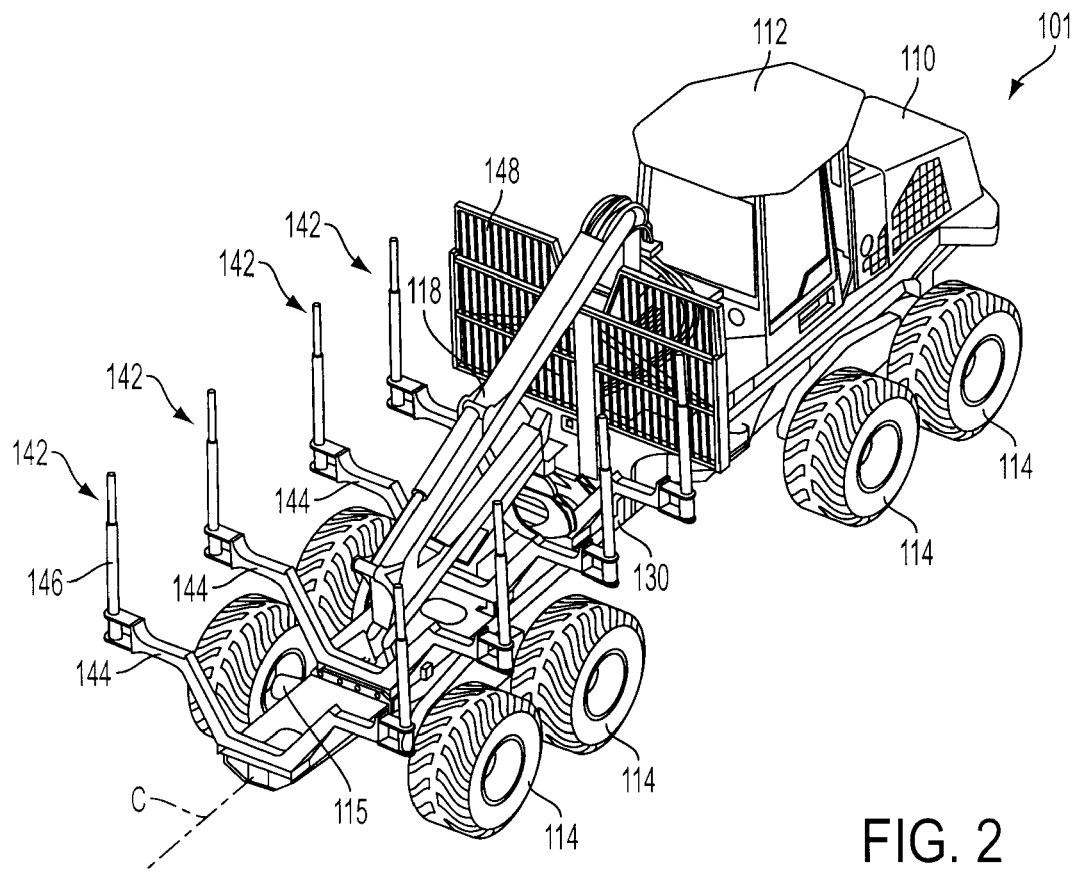

Two outline views from different perspectives of a machine 100 are shown in FIG. 1 and FIG. 2. FIG. 1 is a side view of the machine 100 and FIG. 2 is a three-quarter view from the rear. In the illustrations of FIG. 1 and FIG. 2, the machine 100 is a forwarder 101. In one embodiment, the forwarder 101 includes an articulated frame 102 having an engine frame portion 104 and a payload frame portion 106 connected to one another at a pivot joint 108. In an alternate embodiment, the frame 102 may be a rigid frame with no articulated connections between portions thereof or, alternatively, with more than one articulated joint connecting three or more frame portions to one another. In the illustrated embodiment, the engine frame portion 104 includes an engine beneath an engine cover 110 and an operator cab 112. Each of the engine frame portion 104 and payload frame portion 106 includes four driven wheels 114 for a total of eight driven wheels 114. The eight driven wheels 114 are arranged in pairs, and each pair is arranged on a tandem drive beam 116. Four such tandem drive beams 116 are included with the forwarder 101 to provide adequate traction and stability when traversing rough and/or uneven terrain.

The forwarder 101 in the illustrated embodiment includes a hydrostatic pump (not shown) that is connected to the engine and that provides hydraulic power to various systems, but other types of drive systems may be used. For example, a drive system using electrical or mechanical power may be used to operate the driven wheels 114. In the illustrated embodiment, the drive system of the forwarder 101 includes a hydrostatic motor (not shown) that is connected to a transmission or another type of gear arrangement (not shown) having drivelines mechanically propelling each of the driven wheels 114. Each driven wheel 114 is powered by an axle assembly 115, which may include a planetary gear arrangement. Hydrostatic actuators are also used to actuate a boom or crane 118. The crane 118 in the illustrated embodiment includes three movable arms 120 pivotally interconnected at their respective ends and arranged to pivot in relation to one another by use of one or more hydraulic cylinders 122.

A grapple assembly 124 is connected at one end 126 of the crane 118. At another end 128, the crane 118 is connected to the frame 102 of the forwarder 101 via a base 130. The base 130 can comprise part of the articulated frame 102 and includes or routes various machine components, such as hydraulic cylinders 132 that can pivot the crane 118 either directly or via another arrangement, for example, a rack and pinion. Hydraulic hoses 134 are connected to the one or more hydraulic cylinders 122 and actuators of the grapple assembly 124. During operation, the crane 118 moves relative to the forwarder 101 to position the grapple assembly 124 such that logs can be engaged and loaded onto the payload frame portion 106 of the forwarder 101.

In the illustrated embodiment, four bunks 142 are arranged along the payload frame portion 106 and extend from a segment thereof that is adjacent to the base 130 along the length of the payload frame portion 106. Each of the four bunks 142 has a flattened Y-shape having arms 144 extending horizontally away from a longitudinal centerline, C, of the forwarder 101 and a pair of posts 146 extending upwardly. When logs or other elongate cargo is loaded on the forwarder 101, the four bunks 142 are disposed to retain and align the cargo onto and over the payload frame portion 106 within the space between each pair of posts 146.

A headboard 148 is connected to the payload frame portion 106 and extends in a generally vertical direction away from the articulated frame 102. The headboard 148 provides a bumper or stop that protects the base 130 and the crane 118 from impacts with logs being loaded on the forwarder 101 while also providing a surface that the operator can use to "bump" and align the logs being loaded. In one embodiment, the headboard 148 is an assembly of various components. As illustrated, the headboard 148 is disposed along the frame 102 between the base 130 and the payload area of the frame 102.

Figure 3:
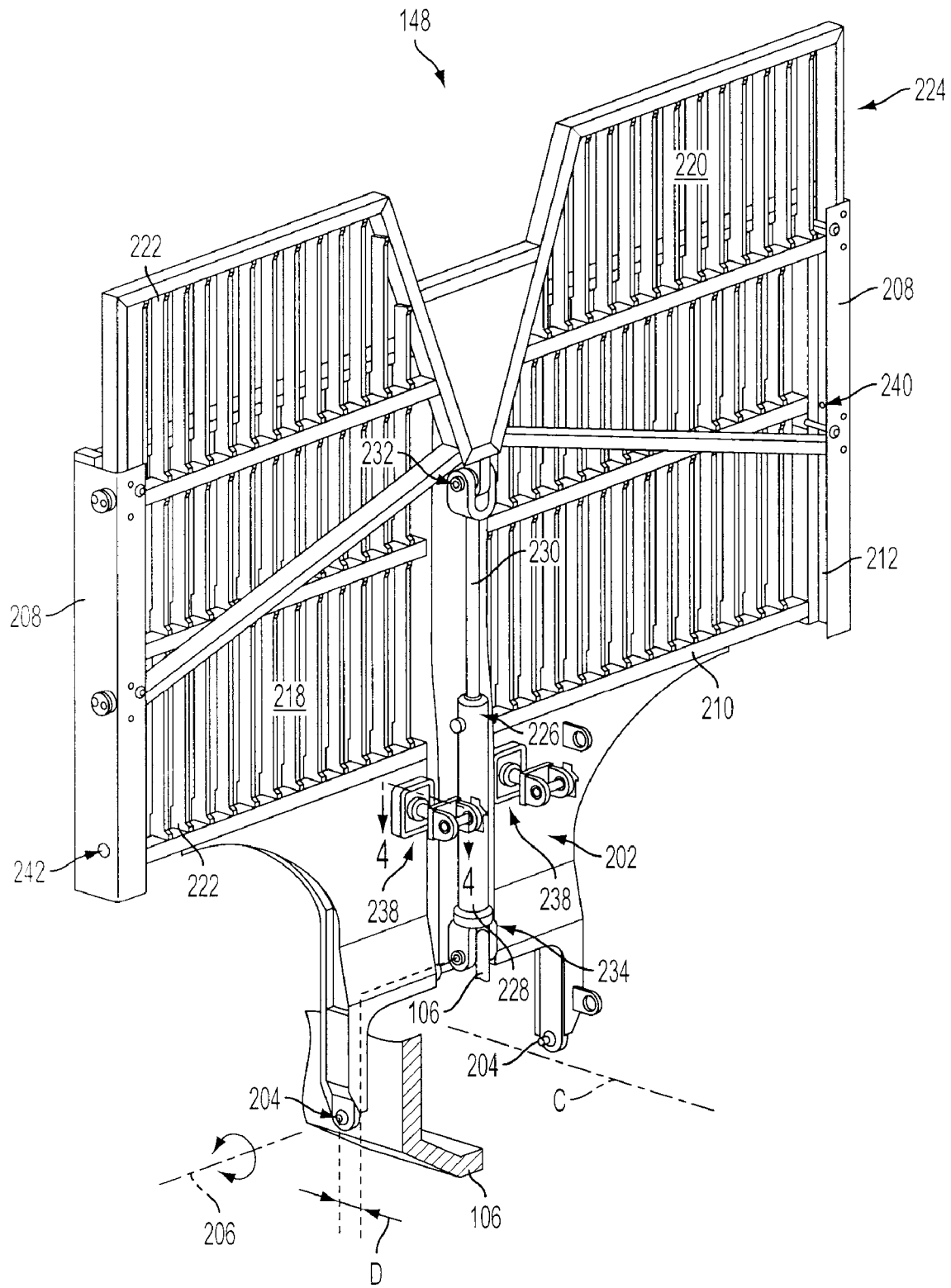
FIG. 3 is an outline view of a headboard assembly, shown removed from the log forwarder illustrated in FIG. 1 and FIG. 2, in accordance with the disclosure.

An outline view of the headboard 148 is illustrated in FIG. 3. In the illustration of FIG. 3 the headboard 148 is shown removed from the forwarder 101 for clarity. The headboard 148 includes a body portion 202 that is hingeably connected to the payload frame portion 106 of the forwarder 101, a segment of which is shown in cross section, with two pins 204 that concentrically lie along a single pivot axis 206. As disclosed, the body portion 202 includes two rails or channels 208 having a generally C-shaped cross section. The channels 208 extend vertically away from a horizontal rail 210 of the body portion 202 and define the outermost margins of the headboard 148. The channels 208 extend parallel to one another and have their open sides facing each other such that they form a frame 212 with the horizontal rail 210. The frame 212 is open on one side and extends generally perpendicularly relative to the longitudinal centerline C of the forwarder 101 when the headboard 148 is in an operating position.

The frame 212 encloses a stationary gate 218 and a moveable gate 220. The stationary gate 218 is rigidly interconnected with the channels 208 and includes a plurality or series of bars 222 that traverse the area between the channels 208. In the illustrated embodiment, the bars 222 extend parallel to each other and to the channels 208 to form a protective barrier. The spacing between the bars 222 is wide enough to provide visibility through the headboard 148 and narrow enough to intercept any logs or other payload from passing between the bars 222. A similar arrangement of bars 222 is formed onto the moveable gate 220. The moveable gate 220 includes a gate frame 224 that is slideably disposed within the frame 212 of the body portion 202. In one embodiment, the gate frame 224 is slideably engaged within opposing openings of the channels 208, which are illustrated as having a C-cross section, such that the gate frame 224 can move relative to the body portion 202 at least partially within the frame 212.

In one embodiment, the gate frame 224 is extended and retracted relative to the frame 212 of the body portion 202 with a linear actuator, which in the illustrated embodiment is a hydraulic actuator 226. The hydraulic actuator 226 includes a piston bore 228 that includes a piston (not shown) connected to an actuator arm 230. The actuator arm 230 is arranged to move relative to the piston bore 228 when pressurized fluid is provided at one side of the piston. A first pin joint 232 rotatably connects an end of the actuator arm 230 with the gate frame 224. A second pin joint 234 rotatably connects an opposite end of the piston bore 228 with the payload frame portion 106 of the forwarder 101, a portion of which is illustrated for clarity. The first pin joint 232 and the second pin joint 234 provide a degree of freedom for pivotal motion of the hydraulic actuator 226 relative to the forwarder 101 and to the headboard 148. As can be appreciated, a distance, D, is defined along the direction of the centerline C between the pivot axis 206 and the second pin joint 234. The distance D serves as a moment arm when rotating the headboard 148 about the single pivot axis 206.

The gate frame 224 of the moveable gate 220 further includes two retention pin openings 240 (only one visible) extending laterally through the gate frame 224. Similarly, the frame 212 of the stationary gate 218 forms two additional retention pin openings 242 (only one visible). The two additional retention pin openings 242 are positioned, one each, along each of the channels 208. When the moveable gate 220 is in the stowed or retracted position, the two retention pin openings 240 in the gate frame 224 are aligned with the two additional retention pin openings 242 in the channels 208. Even though two sets of pin openings are illustrated, one or more than two sets of openings may be used. Moreover, the positioning of the pin opening sets illustrated may be changed as long as any one retention pin opening in the moveable gate 220 may be aligned with a corresponding pin opening in the stationary gate 218 when the moveable gate 220 is at any extended or retracted position relative to the stationary gate 218.

Figure 4:
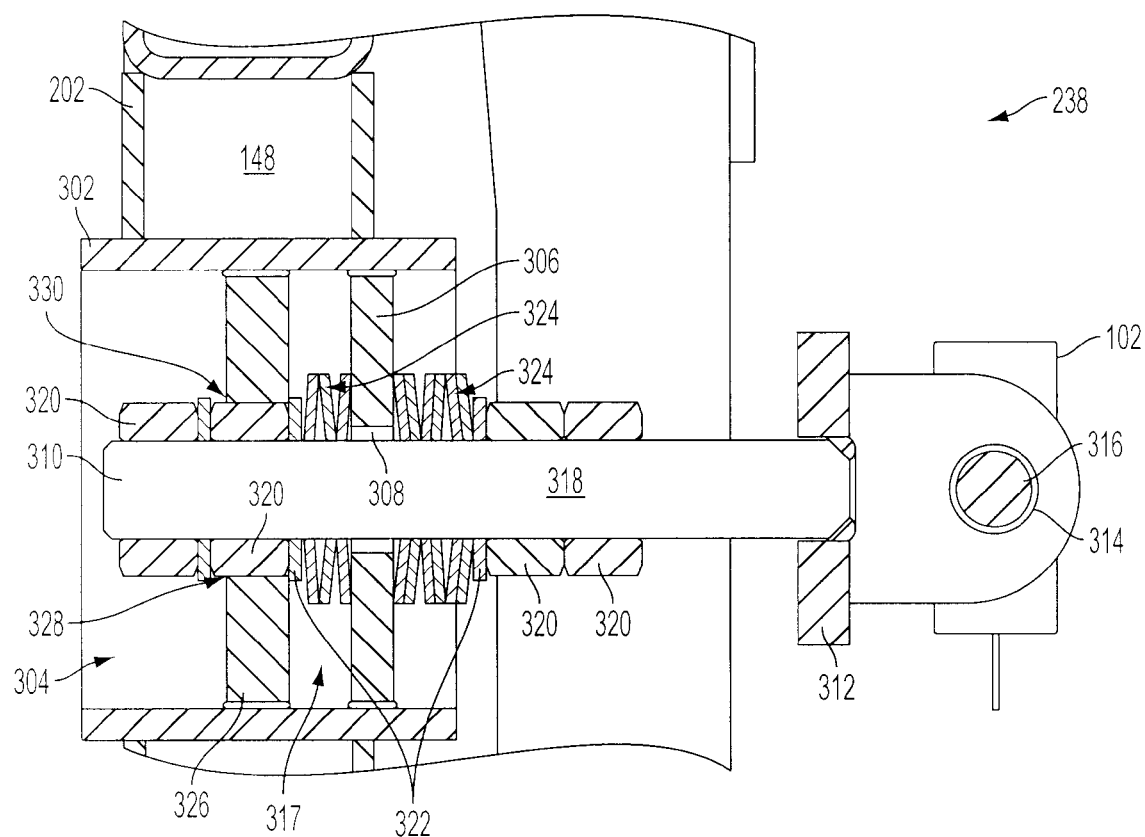
FIG. 4 is a cross section of a stabilizing assembly in accordance with the disclosure.

The headboard 148 further includes two stabilizing pin arrangements 238 connected between the body portion 202 and the frame 102. A cross section view through one of the two stabilizing pin arrangements 238 is shown in FIG. 4. The stabilizing pin arrangement 238 includes a casing 302 that is rigidly connected to the body portion 202 of the headboard 148. The casing 302 forms a bore 304 that includes a washer 306 forming an opening 308. The washer 306 is rigidly connected to the casing 302 and, thus, to the body portion 202 of the headboard 148. An elongate bar 310 extends into the bore 304 of the casing 302 and passes through the opening 308 formed in the washer 306. The elongate bar 310 is connected to a flange 312 at one end thereof. The flange 312 forms a pin opening 314 that is hingeably connected to the frame 102 of the forwarder with a pin 316 extending therethrough.

An opposite end of the elongate bar 310 is connected to the washer 306 with a "floating" connection arrangement 317. The floating connection arrangement 317 is a mechanical connection that permits limited, relative motion between structural elements being connected to one another. In this embodiment, the stabilizing pin arrangement 238 includes resilient elements that can absorb impacts as well as dampen vibration in a bi-directional fashion.

More specifically, the floating connection arrangement 317 connecting the elongate bar 310 to the headboard 148 in the illustrated embodiment includes threaded portions 318 engaged with fasteners or nuts 320. Two sets of nuts 320 retain at least two backing rings 322, with at least one backing ring 322 disposed on either side of the washer 306. The backing rings 322 retain resilient elements or axial springs 324, which are embodied in FIG. 4 as cupped spring washers having a frusto-conical shape, one example of which are so-called BELLEVILLE™ washers, against both sides of the washer 306. Other types of resilient elements may be used, for example, tension springs, rubber grommets, and the like. In the embodiment shown, the casing 302 includes a secondary washer 326 having an opening 328 that slideably engages therewithin one of the nuts 320 to provide axial alignment between the elongate bar 310 and the bore 304 formed in the casing 302.

During operation, vibration or impulse loading imparted to the headboard 148 by logs bumping against it during loading and unloading of the forwarder 101 can be absorbed and/or dampened by the relative motion that is provided by the two stabilizing pin arrangements 238. More specifically, an impulse loading from a log bumping against the headboard 148 will push the headboard 148 in a rightward direction according to the illustration of FIG. 4. Such motion of the headboard 148 will compress the axial springs 324 located on the right, which will absorb some of the energy of the impact. After application of the impact has ceased, the headboard 148 will inherently tend to "bounce" in the opposite direction, i.e. leftward in the illustration, thus expanding the axial springs 324 on the right and compressing the axial springs 324 positioned on the opposite or left side of the washer 306.

Such reciprocal motion may continue until the opposing forces provided by the axial springs 324 become balanced. Optionally, a dampening effect may be provided to reduce the motion of the headboard 148 relative to the frame 102 by addition of a damper (not shown) within the casing. In such an alternate embodiment, for example, interference or friction may be introduced at an interface 330 between the secondary washer 326 and one of the nuts 320. As can be appreciated, any other suitable method of dampening may be used. Moreover, even though axial springs are used in the illustrated embodiment, any other appropriate device may be used to provide resilience and/or dampening effects between the elongate bar 310 and the casing 302. Such alternate devices include rubber grommets, compressed gas or fluid spring/dampers, and so forth.

Figure 5:
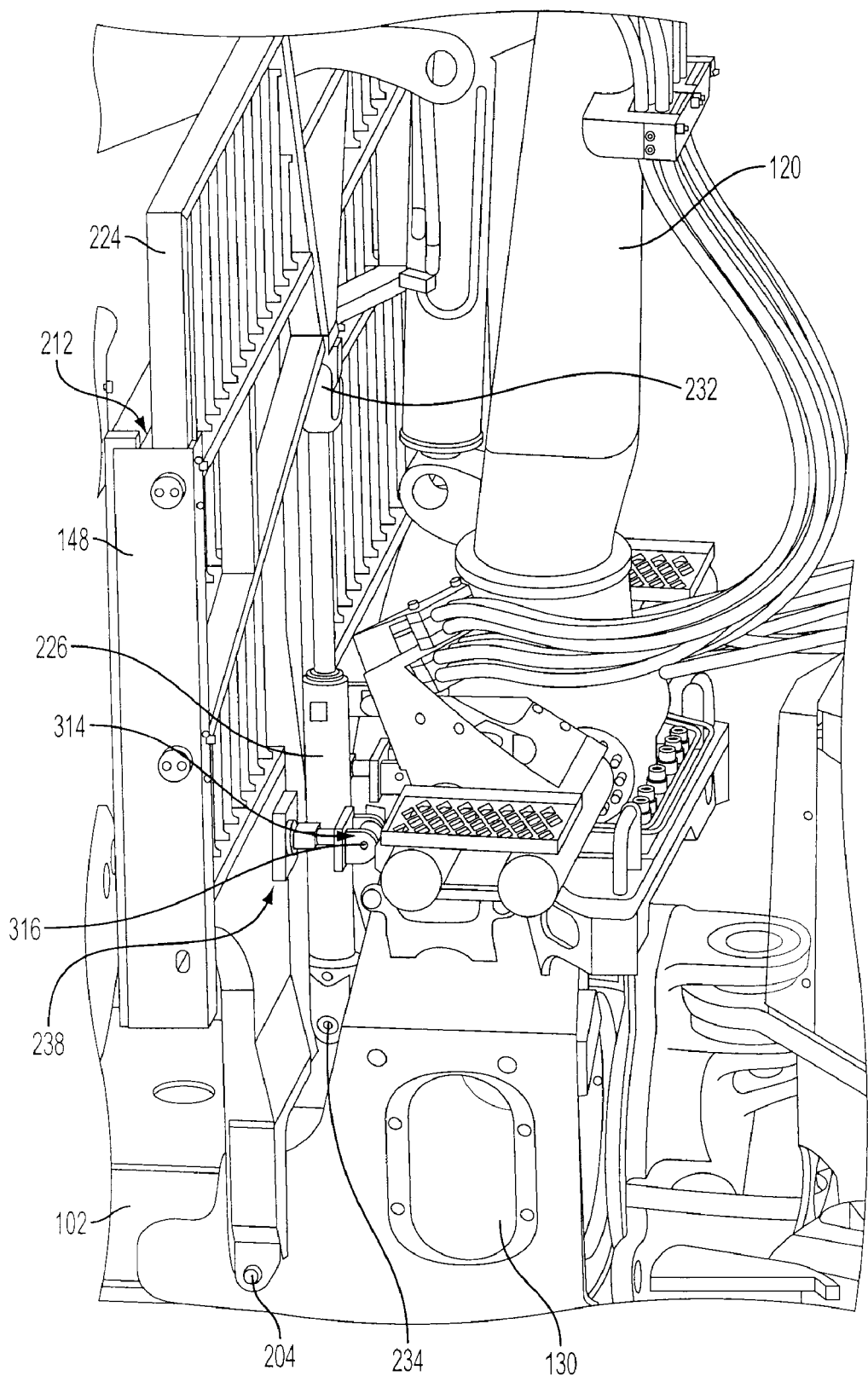
FIG. 5 is a partial outline view of a headboard in an operating position in accordance with the disclosure.

A detail view of the headboard 148 as installed on the forwarder 101 and being in an operating position is shown in FIG. 5. As used herein, the operating position of the headboard 148 is a position having the headboard 148 extending generally perpendicularly relative to the frame 102 of the forwarder 101. The headboard 148 may assume other orientations when in the operating position. When in the operating position, the headboard 148 is connected to the frame 102 at the two pins 204 and at the two pins 316 disposed in the pin openings 314 formed in the two stabilizing pin arrangements 238. The headboard 148 is also connected to the hydraulic actuator 226 at the first pin joint 232. As described above, the hydraulic actuator 226 is connected to the frame 102 and, specifically, to the base 130 at the second pin joint 234.

When the headboard 148 is in the operating position having the pin connections described above, extension of the hydraulic actuator 226 causes the gate frame 224 to extend upward relative to the main structure of the headboard 148. Similarly, retraction of the hydraulic actuator 226 causes the gate frame 224 to retract downward into the frame 212. Such upward or downward motion of the gate frame 224 may be selectively controlled by the operator of the forwarder 101 during loading and unloading of cargo to and from the payload frame portion 106. For example, the gate frame 224 may be retracted to provide increased visibility to the operator when the forwarder 101 is lightly loaded, and may be extended when a heavier or bulkier load has been loaded.

Figure 6:
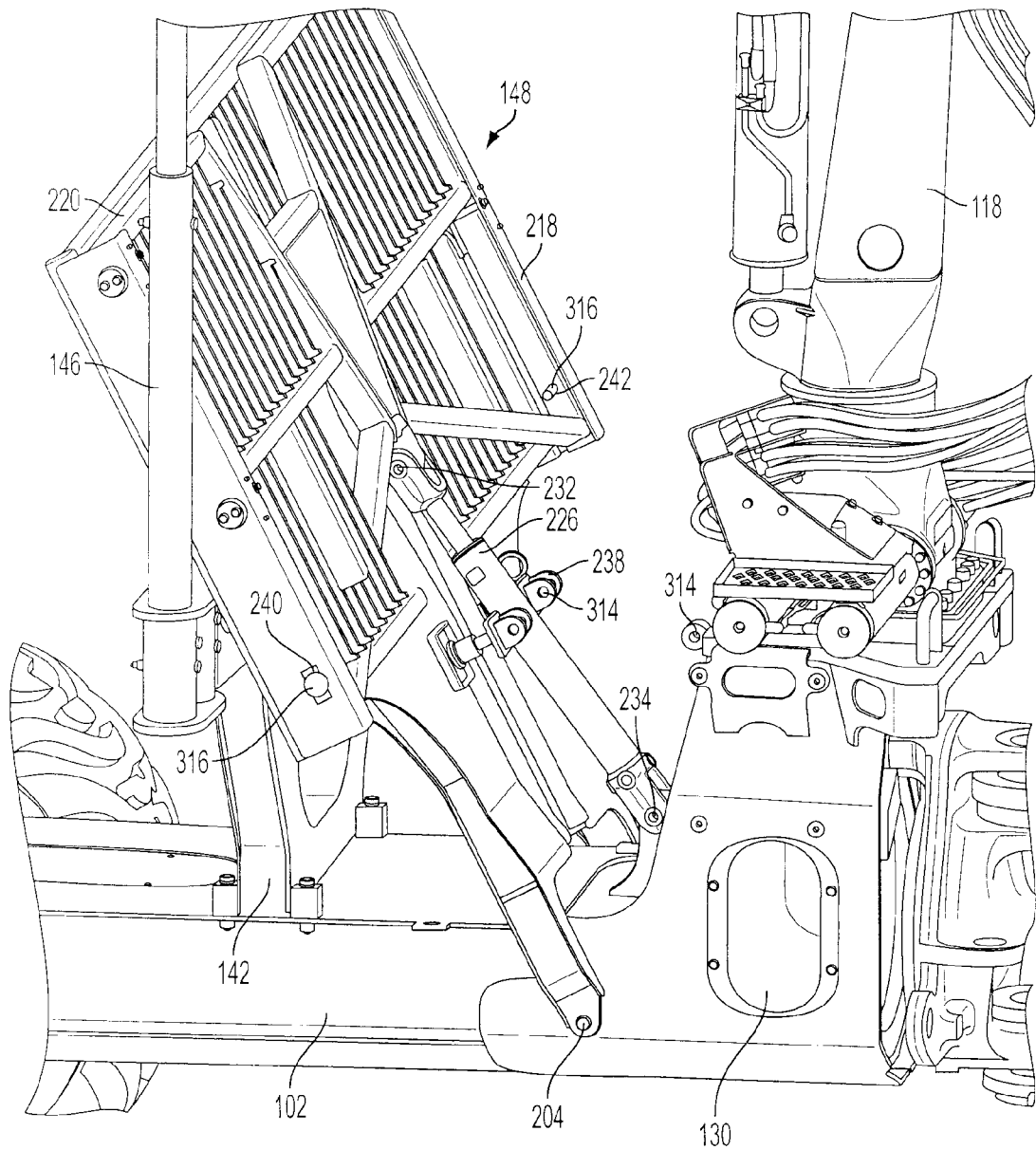
FIG. 6 is a partial outline view of a headboard in a service position in accordance with the disclosure.

A detail view of the headboard 148 as installed on the forwarder 101 and being in a service position is shown in FIG. 6. As used herein, the service position of the headboard 148 is a position having the headboard 148 extending at an angle relative to the frame 102 of the forwarder 101. The headboard 148 may assume other orientations when in the service position, which is intended to provide increased clearance between the headboard 148 and other machine components or systems requiring service access. When in the service position, the headboard 148 is connected to the frame 102 at the two pins 204. The connection between the headboard 148 and the frame 102 at the two pins 316 disposed in the pin openings 314 formed in the two stabilizing pin arrangements 238 is severed by removal of the two pins 316 from their respective pin opening 314, before the headboard 148 can transition from the operating position to the service position.

In one embodiment, the two pins 316 that are removed from the pin openings 314 can be inserted through the two retention pin openings 240. When the moveable gate 220 is in the fully retracted position and the two retention pin openings 240 are aligned with the two additional retention pin openings 242, the two pins 316 can be inserted such that each pin passes through a respective one of the two retention pin openings 240 and its corresponding additional retention pin opening 242. Thus, the two pins 316 can be used to lock or non-slideably engage the moveable gate 220 to the stationary gate 218. The connections of the hydraulic actuator 226 to the headboard 148 at the first pin joint 232 and to the frame 102 at the second pin joint 234 remain unchanged between the operating position and the service position.

When in the service position, the distance D (FIG. 3) between the single pivot axis 206 (FIG. 3) and the second pin joint 234 acts as a moment arm that imparts a rotating moment to the headboard 148 relative to the frame 102 when the hydraulic actuator 226 is extended or retracted. Such rotating moment causes rotation of the headboard 148 away from the base 130 of the crane 118 to provide clearance for access by service technicians to various machine components that are positioned under or close to the base 130. The headboard 148 can return to the generally vertical operating position when the hydraulic actuator 226 is retracted and the moment arm applies a moment in the opposite direction to pull the headboard 148 to a vertical position. When the headboard 148 has returned to the generally standing position, the two pins 316 can be removed from the two retention pin openings 240 and replaced into the pin openings 314 formed in the two stabilizing pin arrangements 238. Such restraining secures the headboard 148 rotationally to the frame 102 and releases the moveable gate 220 to once again slide relative to the stationary gate 218. The transition between the operating and service positions, along with the related pin connections to each position, may be repeated as desired with no structural changes to any component of the machine other than a repositioning of the two pins 316. In one embodiment, a spacing between each pair of posts 146 of the bunks 142 is wide enough to accept the headboard 148 therebetween when the headboard 148 is tilted into the service position, as illustrated in FIG. 6.

INDUSTRIAL APPLICABILITY

The present disclosure is applicable to machines having an onboard crane assembly adapted to load a payload onto a portion of the frame of the machine. A headboard is disposed between the payload portion of the frame and a base of the crane. The headboard is associated with a linear actuator that can selectively extend and retract a portion of the frame. The headboard includes a connection to the frame of the machine that is arranged for absorbing impacts or other types of loading applied to the headboard without causing stresses or other damage to occur in the components associated with the headboard. In one embodiment, a stabilizing arrangement is used for such connection that includes resilient elements that are capable of coping with bidirectional loading applied to the headboard.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated. All methods described herein can be performed in any suitable order unless otherwise indicated herein or otherwise clearly contradicted by context.

We claim:

1. A machine having a frame that includes a payload portion, an operator cab, and a crane disposed on a base connected to the frame between the payload portion and the operator cab, the machine further comprising:
    a headboard assembly connected to the frame and disposed between the base and the payload portion; and
    a stabilizing pin arrangement that includes a floating connection arrangement connecting the headboard assembly to the frame;
    wherein the floating connection arrangement includes at least two resilient elements, each of the at least two resilient elements being disposed on either side of a member connected to the headboard assembly.

2. The machine of claim 1, wherein the stabilizing pin arrangement further includes:
    a casing connected to the headboard assembly and forming a bore extending therethrough;
    a washer disposed within the bore and connected to the casing;
    an opening formed in the washer;
    an elongate bar extending through the opening;
    a flange connected at one end of the elongate bar and forming a pin opening;
    at least one fastener engaged with the elongate bar and disposed on one side of the washer;
    an least one additional fastener engaged with the elongate bar and disposed on another side of the washer;
    a backing ring surrounding the elongate bar and disposed between the at least one fastener and the washer;
    an additional backing ring surrounding the elongate bar and disposed between the at least one additional fastener and the washer.

3. The machine of claim 2, wherein one of the at least two resilient elements is a linear spring disposed between the backing ring and the washer, wherein the other of the at least two resilient elements is an additional linear spring disposed between the additional backing ring and the washer, and wherein the at least two linear springs operate to balance external forces applied to the headboard assembly.

4. The machine of claim 2, further including:
    at least one pin opening formed in the flange;
    a receiving pin opening formed on the frame; and
    a retention pin disposed in the at least one pin opening and extending through the receiving pin opening such that the headboard assembly is connected to the frame.

5. The machine of claim 1, wherein the headboard assembly further includes:
    a stationary gate pivotally connected to the frame and including two channel members having a C-cross section and respective open sides, the two channel members disposed at opposite ends of the stationary gate and having their respective open sides facing one another to define a gate frame; and
    a moveable gate is disposed to slide at least partially within the gate frame.

6. The machine of claim 5, wherein the stationary gate includes a plurality of bars extending across an opening defined by the gate frame.

7. The machine of claim 5, wherein the stationary gate is pivotally connected to the frame at two pins that are rigidly connected to the frame and that extend through respective pin openings formed in the headboard assembly, and wherein the stabilizing pin arrangement is connected to the stationary gate.

8. A stabilizing assembly for a headboard of a log forwarder machine having a frame that includes an engine portion and a payload portion, the log forwarder machine further including a base connected to the payload portion of the frame and a crane connected to the base, wherein the headboard is connected to the payload portion of the frame and includes a stationary gate that is pivotally connected to the frame and a moveable gate that is slidably connected to the stationary gate, the stabilizing assembly comprising:
- a casing connected to the stationary gate and forming a bore extending therethrough;
- a washer disposed within the bore and connected to the casing;
- an opening formed in the washer;
- an elongate bar extending through the opening;
- a flange connected at one end of the elongate bar and forming a pin opening;
- a backing ring connected to the elongate bar and disposed on one side of the washer;
- an additional backing ring connected to the elongate bar and disposed on another side of the washer;
- a linear spring disposed between the backing ring and the washer; and
- an additional linear spring disposed between the additional backing ring and the washer.

9. The stabilizing assembly of claim 8, wherein the linear spring and the additional linear spring operate to balance external forces applied to the headboard.

10. The stabilizing assembly of claim 8, further including:
- a receiving pin opening formed on the frame; and
- a retention pin extending through the pin opening and the receiving pin opening such that the stationary gate is pivotally connected to the frame.

11. The stabilizing assembly of claim 8, wherein the stationary gate includes two channel members having a C-cross section and respective open sides, the two channel members disposed at opposite ends of the stationary gate and having their respective open sides facing one another to define a gate frame, and wherein the moveable gate is disposed to slide at least partially within the gate frame.

12. The stabilizing assembly of claim 11, wherein the stationary gate includes a plurality of bars extending across an opening defined by the gate frame.

13. The stabilizing assembly of claim 8, wherein the stationary gate is pivotally connected to the frame at two pins that are rigidly connected to the frame and that extend through respective pin openings formed in the headboard.

14. A method of operating a log forwarder having a headboard, the log forwarder including a frame defining a payload portion, a base connected to the payload portion, and a crane connected to the base, the headboard being connected to the payload portion of the frame and including a stationary gate that is pivotally connected to the frame and a moveable gate that is slidably connected to the stationary gate, the method comprising:
- providing a stabilizer interconnecting the stationary gate of the headboard with the frame;
- allowing pivotal motion of the headboard relative to the frame by extending and retracting an elongate bar connected to the frame relative to a casing of the stabilizer;
- compressing a first axial spring and extending a second axial spring when the headboard tilts in one direction relative to the frame.

15. The method of claim 14, further including:
extending the first axial spring and compressing the second axial spring when the headboard tilts in an opposite direction relative to the frame.

16. The method of claim 14, further including dampening a vibratory motion of the headboard relative to the frame.

17. The method of claim 14, further including providing fasteners engaged with the elongate bar, and providing a washer connected to the casing and having an opening through which the elongate bar passes.

18. The method of claim 17, wherein the first axial spring and the second axial spring are disposed on alternate sides of the washer.

19. The method of claim 18, further including compressing the first axial spring and the second axial spring, when applicable, between the fasteners and the washer.

20. The method of claim 14, further including providing a secondary washer connected to the casing that engages the elongate bar along an interface such that friction along the interface provides dampening to a vibratory motion of the elongate bar relative to the secondary washer.

* * * * *